United States Patent [19]

Matsumoto et al.

[11] Patent Number: 4,623,962
[45] Date of Patent: Nov. 18, 1986

[54] REGISTER CONTROL PROCESSING SYSTEM

[75] Inventors: Toshio Matsumoto, Kawasaki; Motokazu Kato, Sagamihara; Kiyosumi Sato; Yoshihiro Mizushima, both of Kawasaki; Katsumi Ohnishi, Kawagoe, all of Japan

[73] Assignee: Fujitsu Limited, Kawasaki, Japan

[21] Appl. No.: 509,609

[22] Filed: Jun. 30, 1983

[30] Foreign Application Priority Data

Jun. 30, 1982 [JP] Japan .................. 57-113470

[51] Int. Cl.⁴ .............................................. G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,701,107 | 10/1972 | Williams | 364/200 |
| 3,902,164 | 8/1975 | Kelley et al. | 364/200 |
| 4,010,451 | 3/1977 | Kibble et al. | 364/200 |
| 4,057,848 | 11/1977 | Hayashi | 364/200 |
| 4,136,385 | 1/1979 | Gannon et al. | 364/200 |
| 4,145,738 | 3/1979 | Inoue | 364/200 |
| 4,355,355 | 10/1982 | Butwell et al. | 364/200 |
| 4,490,787 | 12/1984 | Ohya et al. | 364/200 |

Primary Examiner—James D. Thomas
Assistant Examiner—William G. Niessen
Attorney, Agent, or Firm—Staas & Halsey

[57] ABSTRACT

This invention relates to a register and more specifically to register control in a data processing system. In general, a number of control registers are theoretically required that is less than the maximum number which can be designated, and only the required number of registers are mounted as hardware. In order to add functions or to provide compatibility with other systems, it is sometimes required to use a register that is not mounted as hardware, or to use the registers mounted as hardware for conflicting purposes. Virtual registers are accordingly provided for at address locations in the memory of the processing system. However, if only the registers to be added are thusly provided for in the memory, the instructions must be executed by distinguishing between register access and memory access, in accordance with register number, etc. Thus, this invention provides a number of virtual registers for instance equal to the number that can be designated. The controls are thereby simplified in accordance with the kind of instruction to be performed. Namely, when an instruction is the LOAD instruction, the same content is loaded into both real an virtual registers from a respective address of the memory, and when it is the STORE instruction, the content from a respective virtual register is stored into the respective address of the memory.

4 Claims, 3 Drawing Figures

REGISTER CONTROL PROCESSING SYSTEM

BACKGROUND OF THE INVENTION

This invention relates to a register control system in a data processing system, and more specifically to a register control system which, in case a control register is newly defined or a control register originally intended to be used for a particular purpose is to be used for another purpose, provides these control registers "on the memory" (namely, as "virtual" registers, as is explained below to mean storage space is provided at respective addresses in the memory) without relation to the mounting condition on the hardware (that is, as compared to a "real" register implemented by hardware as explained below) and thereby executes control register operations as if they were actually provided in this system as respective hardware.

A central processing unit CPU of a certain architecture is capable of designating, for example, 16 control registers in total, each of which is composed of 32 bits. Each bit of these registers is used for indicating a state occurring during operation or for providing special data for attaining a certain function. However, in practice, in a particular model of a particular type of CPU, only the registers necessary for the functions defined initially will be mounted. For this reason, when it is required for expansion of functions or for compatibility with other types of system, the hardware must be modified for each requirement, including, for example, addition of registers. But modification of hardware is economically disadvantageous. Moreover, as described above, the control registers already defined are required in some cases to be used for other purposes. For example, in case a certain control register used for a certain purpose in a certain system is used for another purpose in another system, if the former system is required for compatibility with the latter system, the one register must be used in both ways for two different purposes as required. This problem can no longer be solved as a problem of hardware.

SUMMARY OF THE INVENTION

It is an object of this invention to solve the above-described problem, and for this purpose this invention defines control registers "on" the memories, that is, at respective addresses of a respective memory. Moreover, a particular instruction execution routine is called by detecting a LOAD instruction (hereinafter, LCTL instruction) concerning control registers. In the instruction execution routine, the content to be loaded is written into the respective designated control register in both the hardware and "on the memory" forms. However, in case a control register is used simultaneously for two different purposes, the content is not written into the control register of the hardware form. When such writing into the pertinent control register is required, such operation is carried out by an instruction other than the LCTL instruction.

In case a STORE instruction (hereinafter STCTL instruction as described below) regarding control registers is detected, the instruction execution routine is called in the same way. In the instruction execution routine, the content of the respective designated virtual control register is read out of the memory and then written into the designated memory area. At this time, data is not read from the control register of the hardware.

The details of this invention will be understood more obviously from the description thereof by referring to the drawings.

DESCRIPTION OF THE PREFERRED EMBODIMENT

This invention is described by way of a preferred embodiment.

Figure 1:
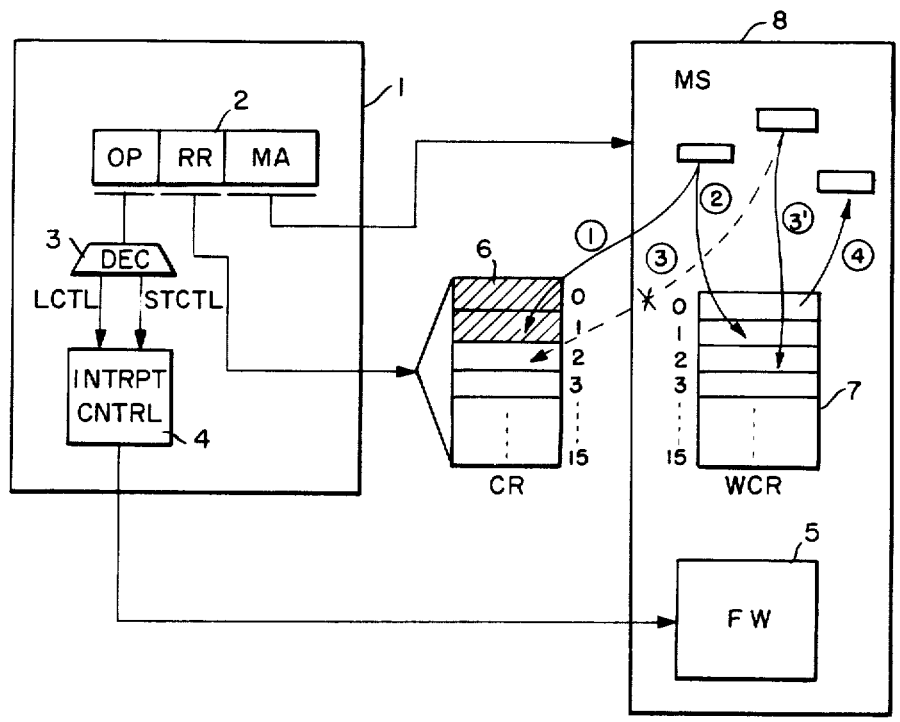
FIG. 1 is a block diagram indicating the basic structure of an embodiment of this invention.

FIG. 1 is a basic structure of an embodiment of this invention. In this figure, 1 is an instruction control part unit I in the central processing unit CPU (not shown). 2 is an instruction register. 3 is a decoder which detects the LCLT instruction and the STCTL instruction. 4 is an interrupt generating circuit. 5 is a particular instruction execution routine firmware FW. 6 is a control register CR provided in the CPU in connection with which a plurality of control registers are described in the following. 7 is a control register WCR defined on the memory in which the respective address are referred to in the following as separate control registers. 8 is a memory MS. The CPU comprises an execution unit E (not shown) which executes operation by receiving a control from the I unit, and an S unit (not shown) which controls interfacing between the I unit, E unit and the memory MS. These can be provided by well known computer systems and are not important to this invention. Therefore, these are not described in this specification.

In general, an instruction consists of the operation code field OP, the register designation field RR and a field for designating a memory address MA, etc.

In addition, the instructions regarding control registers include the LCTL, and STCTL instructions. The LCTL instruction is an instruction to load the content of an addressed memory location designated by the MA field of the instruction to the control register designated by the RR field, while on the contrary, the STCTL instruction is an instruction to store the content of a control register designated by the RR field to the memory at the address designated by the MA field. In addition to these instructions, an instruction for only making reference to the control register and for executing the specified processing in accordance with a value, and an instruction for sending or receiving data between a general purpose register (not shown) in the CPU and the control register, are also prepared. The program execution mode includes the OS mode in which an ordinary instruction is executed directly by the hardware or micro-program, and the firmware mode in which special instructions which cannot be executed by the hardware or micro-program are executed by the routine formed by a combination of ordinary instructions. Said LCTL, STCTL instructions are ordinary instructions which can normally be executed by a system in the OS mode, but which are executed by the firmware mode in this invention.

Figure 2:
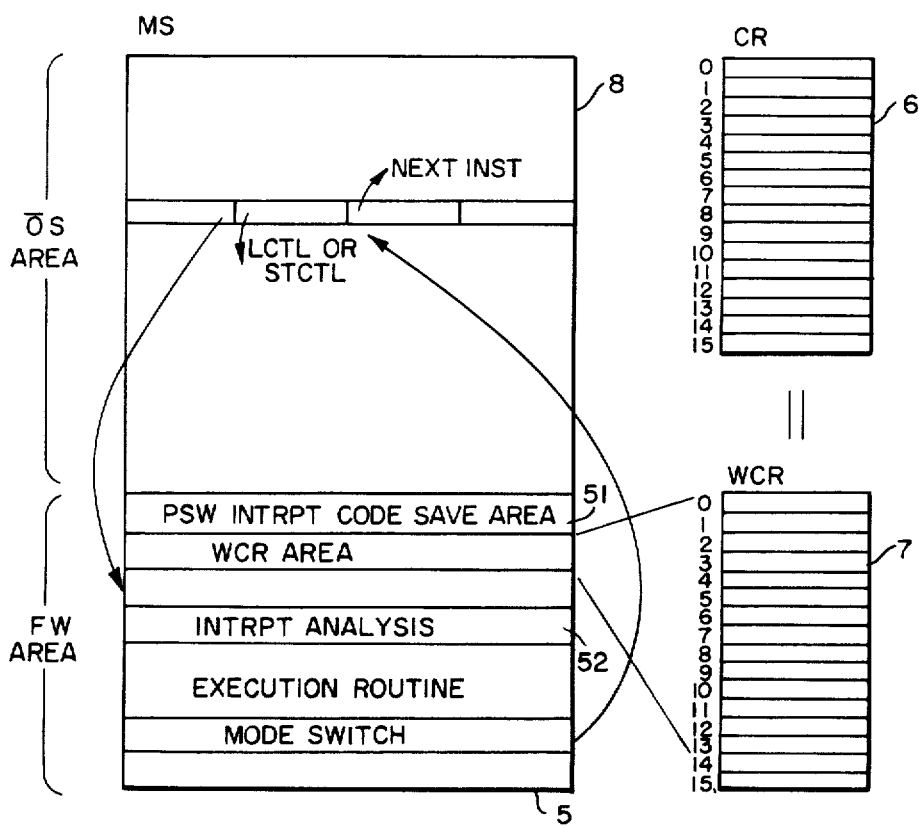
FIG. 2 is a detailed schematic of the firmware 5 in FIG. 1.

FIG. 2 indicates the internal structure of the firmware 5 shown in FIG. 1.

An example of the processing by the LCTL instruction and the STCTL instruction is explained hereunder.

When the decoder 3 of the I unit detects the LCTL instruction under the OS mode, said instruction is not executed and an interrupt to the firmware 5 is generated by the interrupt generating circuit 4. At this time, in the interrupt generating circuit 4, the data such as the program status word PSW and an interrupt code which indicates the cause of the interrupt is stored in the firmware FW region 51 so that the intitial processing can be continued after execution of said routine 5 (refer to FIG. 3), and the OS mode is changed to the firmware mode (hereinafter called the FW mode). The interrupt analysis processing step 52 in the firmware 5 is called, and execution of the LCTL instruction starts after it is recognized that the interrupt is generated by the LCTL instruction.

First, the firmware generates the LCTL instruction which is the same as the above-mentioned LCTL instruction. Thereby, the content to be loaded is written into the designated register among the registers CR0 to CR15 which exist in the hardware form as indicated by 1 in FIG. 1. Here, if a control register not existing in the hardware is designated, no entry to a hardware register is carried out, but the instruction itself is normally executed. However, if a control register which is required to be used simultaneously for two purposes is designated, the loading to this register is inhibitted, as indicated by 3 in FIG. 1, because a prior function is being performed by the register of the hardware. When the content is required to be loaded to this register, it is carried out alternately by another instruction, for example, the load instruction to the general purpose register from the memory and the write instruction to the control register from the general purpose register.

Then, as indicated by 2 and 3' in FIG. 1, the content of the address location designated by the MA field of the LCTL instruction is written into the designated register among the control registers WCR0 to WCR15 defined on the memory by a MOVE instruction, and the execution of the LCTL instruction is completed. Thereby, the content of the control register CR and that of the virtual control register WRC defined on the memory become equal, aside from the special control registers described above and the registers not existing in the hardware.

Figure 3:
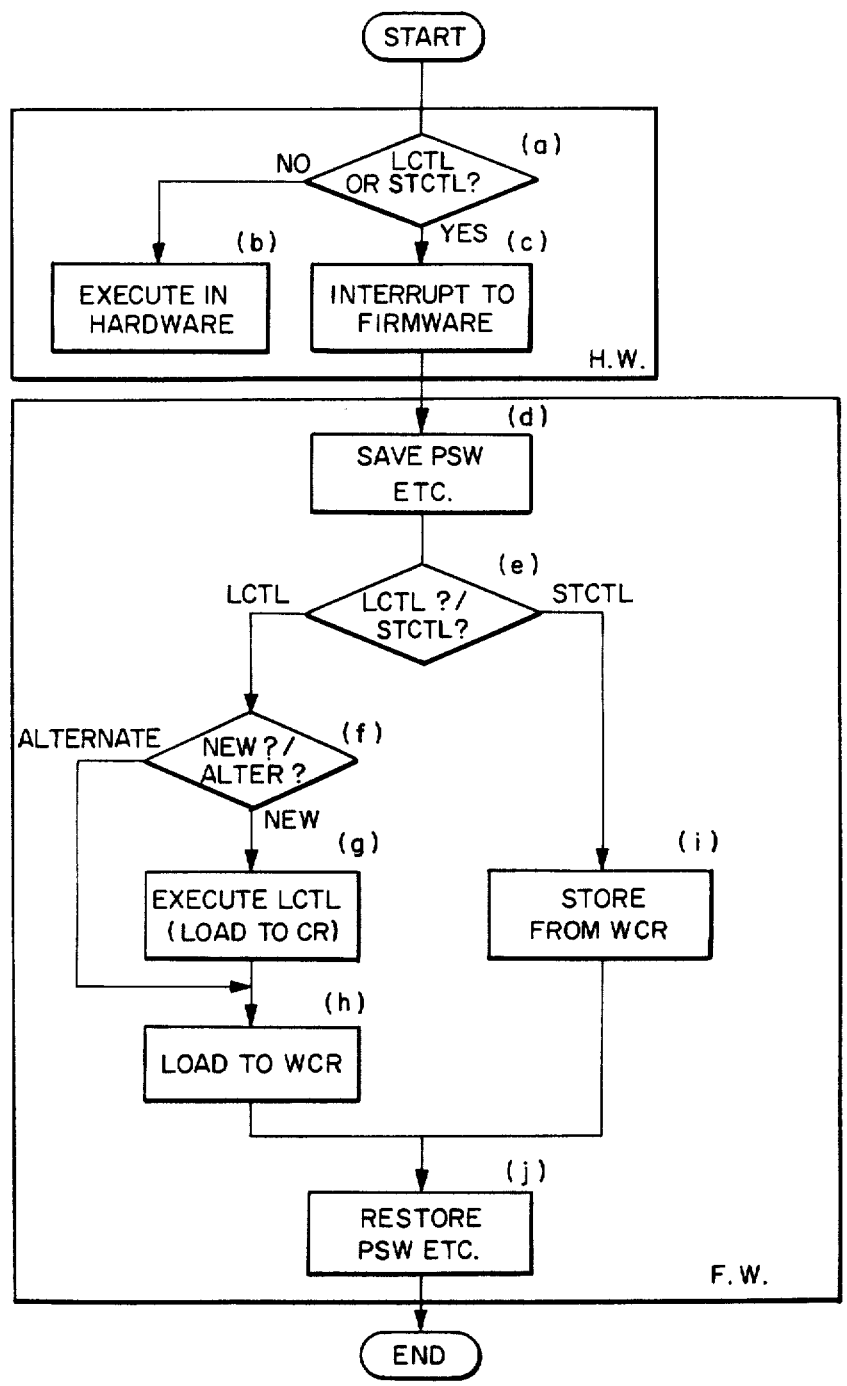
FIG. 3 is a flow chart indicating firmware processing.

Moreover, the PSW stored by the interruption is read from the region 51 in order to continue the processing, and the operation mode returns to the OS mode from the FW mode (refer to FIG. 3).

As in the case of the SCTCL instruction, when the decoder 3 of the I unit detects the STCTL instruction, an interrupt is generated in the firmware 5, and the operation mode changes to the FW mode from the OS mode. In the STCTL instruction execution routine, the content of the designated register among the virtual registers WCR0 to WCR15, provided for "on" the memory, is read out and then written into the address designated in the operand field of the SCTCL instruction by a MOVE instruction as shown by 4 in FIG. 1, and thereby execution of the instruction is completed. At this time, since the latest (most recent) content is stored in the respective one of the registers WCR0 to WCR15, it is not required that data be read from the register 6 of the hardware.

In addition, the PSW stored by the interruption is read from the region 51, the operation mode is changed to the OS mode from the FW mode, and the instruction following the STCTL instruction is called. Thereby the processing is continued.

FIG. 3 is a flow chart indicating the firmware operations described above. First, (a) each instruction in the OS mode is checked as to whether the instruction code is LCTL or STCTL. If it is not either of them, (b) it is processed by the hardware (including a processing by the micro-instructions). When it is either the LCTL or the STCTL instructions, (c) the interruption to the firmware is started. These operations are carried out by hardware or micro-program.

In the firmware thus started, first, (d) the processing required for the saving of the PSW and the interruption is executed, and (e) the LCTL or STCTL is identified. When it is the LCTL instruction, (f) it is checked that a designated register is newly defined (NEW?) or is to be used for another purpose (ALTERNATE?). This can be judged by referring to the saved PSW or to a special control register. When a designated register is newly defined, (g) the LCTL instruction to said register is executed. When this instruction is detected in the firmware mode, it is immediately executed. This function is intrinsically provided in the hardware. Loading to the registers on the hardware terminates by execution of the LCTL instruction. Subsequently, (h) loading is also carried out to the virtual WCR provided for "on" the memory. In the step (f), if an existing designated register is to be used for other purposes, processing moves to the step (h), skipping the step (g). Moreover, in the step (e), when an instruction is the STCTL instruction, (i) data is stored only from the WCR using the MOVE instruction.

As explained above, 16 virtual registers in total are provided and thereby the same content is loaded to both the virtual and real registers, when the real registers provided in the hardware in fact exist. Therefore, it is no longer necessary to distinguish the real and virtual registers by checking the register number, and accordingly control can be realized easily.

We claim:

1. A processing system comprising:
   at least one control register;
   a memory, respective addresses of which provide for a virtual register corresponding 1:1 to each said control register and for at least one further virtual register;
   means for respectively detecting a load control instruction and a store control instruction; and
   means for writing the same data into both the respective control register and the corresponding virtual register responsive to said load control instruction, and for reading only from the respective virtual register responsive to said store control instruction.

2. A processing system comprising:
   a processor operated by instructions, said processor including a plurality of control registers of a number that is less than a maximum number of registers that can be designated by register designation data of said instructions of said processor;
   a memory for providing at respective addresses a plurality of virtual registers equal in number to or less than said maximum number; and
   means for executing processing for a first predetermined one of said instructions with respect to both the respective control register and the corresponding virtual register and for a second predetermined one of said instructions only with respect to the respective virtual register.

3. The system of claim 2, wherein the number of said plurality of virtual registers is equal to said maximum number.

4. A data processing system comprising
- a plurality of control registers provided in hardware form,
- a memory, including a firmware part for storing at respective addresses instructions for performing a plurality of predetermined operations, and a virtual register part respective addresses of which serve as corresponding virtual registers, including a virtual register corresponding to each said control register and at least one further virtual register,
- means for determining when each said predetermined operation is to be performed and for referring to the respective instructions of said firmware part for performing the respective predetermined operation, wherein, for a first of said predetermined operations, the content of the same address of the memory is loaded into a respective control register and the corresponding virtual register, and, for a second of said predetermined operations, the content of only the respective virtual register is stored into a respective address of said memory.

* * * * *